United States Patent [19]
Oomae et al.

[11] Patent Number: 5,299,305
[45] Date of Patent: Mar. 29, 1994

[54] METHOD FOR GENERATING FORMS AND FOR PROCESSING AND TRANSFERRING DATA AMONG THE FORMS

[75] Inventors: Hidehiro Oomae, Yokohama; Hidenari Makino, Kawasaki; Atsushi Tanaka, Tokyo; Hideo Sato, Kamakura, all of Japan

[73] Assignees: Hitachi, Ltd., Tokyo; Hitachi Nuclear Engineering Co., Inc., Hitachi, both of Japan

[21] Appl. No.: 780,462

[22] Filed: Oct. 22, 1991

[30] Foreign Application Priority Data

Oct. 22, 1990 [JP]  Japan .................................. 2-282007

[51] Int. Cl.$^5$ ............................................. G06F 15/40
[52] U.S. Cl. ........................... 395/149; 395/145; 364/DIG. 2; 364/943; 364/943.1; 364/943.5
[58] Field of Search ............... 395/700, 149, 148, 146, 395/145

[56] References Cited

U.S. PATENT DOCUMENTS 5,182,709   1/1993   Makus .................................. 364/419

Primary Examiner—Kevin A. Kriess
Attorney, Agent, or Firm—Fay, Sharpe, Beall, Fagan, Minnich & McKee

[57] ABSTRACT

A method of generating a plurality of forms that are related with one another, and more particularly a man-machine interface at a stage of generating forms, is able to define or correct form-relation definitions at a stage of inputting data in the forms from a standpoint of using the forms. The method is further able to realize definition and correction among forms merely by designating corresponding areas on a screen of a display device. Mutually-related forms are outputted to the display device based on predetermined form definitions, a message for calling upon an operator to perform a selective designation in order to determine an area to be adopted as a data transfer origin and an area to be adopted as a data transfer destination out of areas of the displayed forms is displayed, the area to be adopted as the transfer origin and the area to be adopted as the transfer destination are determined from the coordinate data inputted by the operator, the data loaded in the transfer origin area are transferred to the transfer destination area based on the relationship between the transfer origin area and the transfer destination area and the information relating to the forms, and transferred data are displayed in the transfer destination area.

8 Claims, 19 Drawing Sheets

FIG. 3
ITEM DEFINITION TABLE FOR "A" FORM — 650

| ITEM No. | CLASSIFICATION | ITEM INFORMATION ||||||| ITEM NAME | ATTRIBUTE |
| | | POSITION || SIZE | COLOR | EDITION TABLE POINTER FOR DISPLAY | PROCESSING INFORMATION TABLE POINTER | DATA AREA TABLE POINTER | | |
| | | COLUMN | ROW | | | | | | | |
|---|---|---|---|---|---|---|---|---|---|---|
| 1 | 0 | 71 | 4 | 6 | 2 | 1 |  | 1 | FORM No. | 2 |
| 2 | 0 | 78 | 4 | 1 | 2 |  |  | 2 | CD | 2 |
| 3 | 0 | 9 | 4 | 20 | 1 | 2 |  | 3 | CUSTOMERS NAME | 1 |
| 4 | 0 | 5 | 7 | 20 | 1 |  |  | 4 | DESTINATION | 1 |
| 5 | 0 | 28 | 7 | 2 | 1 | 3 |  | 5 | DELIVERY YEAR | 2 |
| 6 | 0 | 32 | 7 | 2 | 1 | 4 |  | 6 | DELIVERY MONTH | 2 |
| 7 | 0 | 36 | 7 | 2 | 1 | 5 |  | 7 | DELIVERY DAY | 2 |
| 8 | 0 | 44 | 7 | 6 | 1 | 6 |  | 8 | CUSTOMERS CODE | 1 |
| 9 | 0 | 59 | 6 | 20 | 1 |  |  | 9 | CUSTOMER | 1 |
| 10 | 1 | 4 | 11 | 8 | 1 | 7 |  | 1 | COMMODITY CODE | 1 |
| 11 | 1 | 15 | 11 | 20 | 1 |  |  | 2 | TYPE No. | 1 |
| 12 | 1 | 38 | 11 | 3 | 1 |  |  | 3 | QTY. | 2 |
| 13 | 1 | 42 | 11 | 7 | 1 | 8 |  | 4 | UNIT PRICE | 2 |
| 14 | 1 | 51 | 11 | 10 | 1 | 9 | 1 | 5 | SUM | 2 |
| 15 | 1 | 63 | 11 | 10 | 1 |  |  | 6 | REMARKS | 2 |
| 16 | 0 | 49 | 16 | 12 | 1 | 10 | 2 | 10 | SUM TOTAL | 2 |
| 17 | 0 | 13 | 16 | 8 | 1 |  |  | 11 | DELIVERY CLASSIFFICATION | 1 |
| 18 | 0 | 13 | 17 | 24 | 1 |  |  | 12 | NOTE | 1 |

FIG. 4
DETAIL DATA TABLE FOR "A" FORM — 655

| CLASSIFICATION | NUMBER OF ITEMS | HEAD ITEM NUMBER | LAST ITEM NUMBER | TOTAL LENGTH | NUMBER OF DISPLAY ROWS | TOTAL NUMBER OF ROWS |
|---|---|---|---|---|---|---|
| 1 | 6 | 10 | 15 | 58 | 5 | 20 |

EDITION TABLE FOR DISPLAY OF "A" FORM  ~660

| No. | CODE | COMMA | PADDING CHARACTER | JUSTIFICATION | SIZE | HALF-TONE DOT MESHING |
|---|---|---|---|---|---|---|
| 1 | 0 | 0 | 1 | 0 | 0 | 0 |
| 2 | 0 | 0 | 0 | 3 | 0 | 0 |
| 3 | 0 | 0 | 1 | 0 | 0 | 0 |
| 4 | 0 | 0 | 1 | 0 | 0 | 0 |
| 5 | 0 | 0 | 1 | 0 | 0 | 0 |
| 6 | 0 | 0 | 1 | 0 | 0 | 0 |
| 7 | 0 | 0 | 1 | 0 | 0 | 0 |
| 8 | 0 | 3 | 0 | 0 | 0 | 0 |
| 9 | 1 | 3 | 0 | 0 | 0 | 0 |
| 10 | 1 | 3 | 0 | 0 | 0 | 0 |

PROCESSING INFORMATION TABLE OF "A" FORM  ~665

| No. | INPUT INFORMATION | OUTPUT INFORMATION |
|---|---|---|
| 1 |  | (UNIT PRICE)×(QTY) |
| 2 |  | SUM |

DATA TABLE OF "A" FORM  ~670

| No. | DATA |
|---|---|
| 1 |  |
| 2 |  |
| 3 |  |
| 4 |  |
| 5 |  |
| 6 |  |
| 7 |  |
| 8 |  |
| 9 |  |
| 10 |  |
| 11 |  |
| 12 |  |

FIG. 9

RULE TABLE OF "A" FORM 680

| START POSITION | | END POSITION | | LINE TYPE | COLOR | POSITION | ROW INTERVAL |
|---|---|---|---|---|---|---|---|
| COLUMN | ROW | COLUMN | ROW | | | | |
| 69 | 3 | 77 | 5 | 1 | 1 | 0 | 1 |
| 77 | 3 | 79 | 5 | 1 | 1 | 0 | 1 |
| 9 | 4 | 29 | 4 | 1 | 1 | 2 | 0 |
| 5 | 6 | 25 | 8 | 1 | 1 | 0 | 1 |
| 27 | 6 | 39 | 6 | 1 | 1 | 0 | 0 |
| 27 | 7 | 31 | 8 | 1 | 1 | 0 | 0 |
| 31 | 7 | 35 | 8 | 1 | 1 | 0 | 0 |
| 35 | 7 | 39 | 8 | 1 | 1 | 0 | 0 |
| 41 | 6 | 53 | 8 | 1 | 1 | 0 | 1 |
| 3 | 10 | 13 | 11 | 1 | 1 | 0 | 0 |
| 13 | 10 | 37 | 11 | 1 | 1 | 0 | 0 |
| 37 | 10 | 41 | 11 | 1 | 1 | 0 | 0 |
| 41 | 10 | 49 | 11 | 1 | 1 | 0 | 0 |
| 49 | 10 | 61 | 11 | 1 | 1 | 0 | 0 |
| 61 | 10 | 73 | 11 | 1 | 1 | 0 | 0 |
| 3 | 11 | 13 | 16 | 1 | 1 | 0 | 0 |
| 13 | 11 | 37 | 16 | 1 | 1 | 0 | 0 |
| 37 | 11 | 41 | 16 | 1 | 1 | 0 | 0 |
| 41 | 11 | 49 | 16 | 1 | 1 | 0 | 0 |
| 49 | 11 | 61 | 16 | 1 | 1 | 0 | 0 |
| 61 | 11 | 73 | 16 | 1 | 1 | 0 | 0 |
| 3 | 16 | 13 | 18 | 1 | 1 | 0 | 1 |
| 13 | 16 | 21 | 17 | 1 | 1 | 0 | 0 |
| 41 | 16 | 49 | 17 | 1 | 1 | 0 | 0 |
| 49 | 16 | 61 | 17 | 1 | 1 | 0 | 0 |
| 13 | 17 | 37 | 18 | 1 | 1 | 0 | 0 |

FIG. 10

HEADING TABLE OF "A" FORM — 685

| START POSITION | | DIRECTION | SIZE | COLOR | CHARACTER TYPE | DISPLAY CHARACTER |
|---|---|---|---|---|---|---|
| COLUMN | ROW | | | | | |
| 35 | 2 | 0 | 6 | 1 | 1 | FORM "A" |
| 69 | 3 | 0 | 8 | 1 | 0 | FORM No. |
| 77 | 3 | 0 | 2 | 1 | 0 | CD |
| 5 | 4 | 0 | 4 | 1 | 0 | CUSTOMERS NAME |
| 29 | 4 | 0 | 2 | 1 | 0 | MESSRS |
| 8 | 6 | 0 | 14 | 1 | 0 | DELIVERY LOCATION |
| 28 | 6 | 0 | 10 | 1 | 0 | DELIVERY DATE |
| 41 | 6 | 0 | 12 | 1 | 0 | CUSTOMERS CODE |
| 55 | 6 | 1 | 3 | 1 | 0 | CUSTOMER |
| 3 | 10 | 0 | 10 | 1 | 0 | COMMODITY CODE |
| 19 | 10 | 0 | 12 | 1 | 0 | TYPE ∆∆∆∆ NUMBER |
| 37 | 10 | 0 | 4 | 1 | 0 | QTY. |
| 43 | 10 | 0 | 4 | 1 | 0 | UNIT PRICE |
| 53 | 10 | 0 | 4 | 1 | 0 | SUM |
| 65 | 10 | 0 | 4 | 1 | 0 | REMARKS |
| 4 | 16 | 0 | 8 | 1 | 0 | DELIVERY CLASSIFICATION |
| 43 | 16 | 0 | 4 | 1 | 0 | SUM TOTAL |
| 6 | 17 | 0 | 4 | 1 | 0 | NOTE |

FIG. 11

ITEM DEFINITION TABLE OF "B" FORM  750

| ITEM No. | CLASSIFICATION | ITEM INFORMATION ||||||| ITEM NAME | ATTRIBUTE |
| | | POSITION || SIZE | COLOR | EDITION TABLE POINTER FOR DISPLAY | PROCESSING INFORMATION TABLE POINTER | DATA AREA TABLE POINTER | | |
| | | COLUMN | ROW | | | | | | | |
|---|---|---|---|---|---|---|---|---|---|---|
| 1 | 0 | 71 | 4 | 6 | 2 | 1 | | 1 | FORM No. | 2 |
| 2 | 0 | 78 | 4 | 1 | 2 | | | 2 | CD CUSTOMERS CODE | 2 |
| 3 | 0 | 17 | 3 | 6 | 1 | 2 | | 3 | | 1 |
| 4 | 0 | 17 | 5 | 20 | 1 | | | 4 | CUSTOMER | 1 |
| 5 | 0 | 17 | 7 | 20 | 1 | | | 5 | CUSTOMERS NAME | 1 |
| 6 | 0 | 17 | 9 | 20 | 1 | | | 6 | DESTINATION | 1 |
| 7 | 0 | 19 | 11 | 2 | 1 | 3 | | 7 | DELIVERY YEAR | 2 |
| 8 | 0 | 25 | 11 | 2 | 1 | 4 | | 8 | DELIVERY MONTH | 2 |
| 9 | 0 | 31 | 11 | 2 | 1 | 5 | | 9 | DELIVERY DATE | 2 |
| 10 | 0 | 17 | 13 | 12 | 1 | 6 | | 10 | TOTAL | 2 |
| 11 | 0 | 13 | 16 | 8 | 1 | | | 11 | DELIVERY CLASSIFICATION | 1 |
| 12 | 0 | 13 | 17 | 24 | 1 | | | 12 | REMARKS | 1 |
| 13 | 0 | 53 | 17 | 6 | 1 | 7 | | 13 | RECEIVER CODE | 1 |
| 14 | 0 | 45 | 18 | 12 | 1 | | | 14 | RECEIVER | 1 |

FIG. 12

EDITION TABLE FOR DISPLAY OF "B" FORM                    760

| No. | CODE | COMMA | PADDING CHARACTER | JUSTIFICATION | SIZE | HALF-TONE DOT MESHING |
|-----|------|-------|-------------------|---------------|------|-----------------------|
| 1   | 0    | 0     | 1                 | 0             | 0    | 0                     |
| 2   | 0    | 0     | 1                 | 0             | 0    | 0                     |
| 3   | 0    | 0     | 1                 | 0             | 0    | 0                     |
| 4   | 0    | 0     | 1                 | 0             | 0    | 0                     |
| 5   | 0    | 0     | 1                 | 0             | 0    | 0                     |
| 6   | 0    | 3     | 0                 | 0             | 0    | 0                     |
| 7   | 0    | 0     | 1                 | 0             | 0    | 0                     |

FIG. 13

DATA TABLE OF "B" FORM    770

| No. | DATA |
|-----|------|
| 1   |      |
| 2   |      |
| 3   |      |
| 4   |      |
| 5   |      |
| 6   |      |
| 7   |      |
| 8   |      |
| 9   |      |
| 10  |      |
| 11  |      |
| 12  |      |
| 13  |      |
| 14  |      |

FIG. 14

RULE TABLE OF "B" FORM            780

| START POSITION | | END POSITION | | LINE TYPE | COLOR | POSITION | ROW INTERVAL |
|---|---|---|---|---|---|---|---|
| COLUMN | ROW | COLUMN | ROW | | | | |
| 17 | 3 | 23 | 4 | 1 | 1 | 0 | 0 |
| 69 | 3 | 77 | 5 | 1 | 1 | 0 | 1 |
| 77 | 3 | 79 | 5 | 1 | 1 | 0 | 1 |
| 17 | 5 | 37 | 6 | 1 | 1 | 0 | 0 |
| 17 | 7 | 37 | 8 | 1 | 1 | 0 | 0 |
| 17 | 9 | 37 | 10 | 1 | 1 | 0 | 0 |
| 17 | 11 | 37 | 12 | 1 | 1 | 0 | 0 |
| 17 | 13 | 31 | 14 | 1 | 1 | 0 | 0 |
| 3 | 16 | 13 | 18 | 1 | 1 | 0 | 0 |
| 13 | 16 | 21 | 17 | 1 | 1 | 0 | 0 |
| 13 | 17 | 37 | 18 | 1 | 1 | 0 | 0 |
| 41 | 17 | 43 | 20 | 1 | 1 | 0 | 0 |
| 43 | 17 | 49 | 18 | 1 | 1 | 0 | 0 |
| 49 | 17 | 59 | 18 | 1 | 1 | 0 | 0 |
| 43 | 18 | 59 | 20 | 1 | 1 | 0 | 0 |

FIG. 15

HEADING TABLE OF "B" FORM     785

| START POSITION | | DIRECTION | SIZE | COLOR | CHARACTER TYPE | DISPLAY CHARACTER |
| COLUMN | ROW | | | | | |
|---|---|---|---|---|---|---|
| 35 | 2 | 0 | 6 | 1 | 1 | FORM "B" |
| 3 | 3 | 0 | 12 | 1 | 0 | CUSTOMERS CODE |
| 69 | 3 | 0 | 8 | 1 | 0 | FORM No. |
| 77 | 3 | 0 | 2 | 1 | 0 | CD |
| 3 | 5 | 0 | 6 | 1 | 0 | CUSTOMER |
| 3 | 7 | 0 | 4 | 1 | 0 | CUSTOMERS NAME |
| 3 | 9 | 0 | 8 | 1 | 0 | DESTINATION |
| 3 | 11 | 0 | 10 | 1 | 0 | DELIVERY DATE |
| 21 | 11 | 0 | 2 | 1 | 0 | YEAR |
| 27 | 11 | 0 | 2 | 1 | 0 | MONTH |
| 33 | 11 | 0 | 2 | 1 | 0 | DAY |
| 3 | 13 | 0 | 8 | 1 | 0 | TOTAL |
| 29 | 13 | 0 | 2 | 1 | 0 | ¥ |
| 4 | 16 | 0 | 8 | 1 | 0 | DELIVERY CLASSIFICATION |
| 6 | 17 | 0 | 4 | 1 | 0 | REMARKS |
| 41 | 17 | 1 | 3 | 1 | 0 | RECEIVER |
| 43 | 17 | 0 | 6 | 1 | 0 | CODE |

FIG. 20

"A" FORM – "B" FORM TRANSFER TABLE

| TRANSFER RELATIONSHIP | TRANSFER ORIGIN ITEM NAME | TRANSFER DESTINATION ITEM NAME | TRANSFER ORIGIN ROW | TRANSFER DESTINATION ROW |
|---|---|---|---|---|
| A → B | FORM No. CD CUSTOMERS NAME DESTINATION DELIVERY YEAR DELIVERY MONTH DELIVERY DAY CUSTOMERS CODE CUSTOMER SUM TOTAL DELIVERY CLASSIFICATION REMARKS | FORM No. CD CUSTOMERS NAME DESTINATION DELIVERY YEAR DELIVERY MONTH DELIVERY DAY CUSTOMERS CODE CUSTOMER SUM TOTAL DELIVERY CLASSIFICATION REMARKS | | |

| No. | DATA |
|---|---|
| 1 | 158169 |
| 2 | 0 |
| 3 | HITACHI COMPUTER |
| 4 | GINZA HEAD OFFICE |
| 5 | 90 |
| 6 | 07 |
| 7 | 29 |
| 8 | 654321 |
| 9 | HITACHI SALES |
| 10 | 100000 |
| 11 | 00000000 |
| 12 | DELIVERY |

FIG. 25  ~675

| No. | DATA |
|---|---|
| 1 | 40013327 |

| No. | DATA |
|---|---|
| 1 | 30091254 |
| 2 | STEREO S-55 |
| 3 | 1 |
| 4 | 80000 |
| 5 | 80000 |
| 6 |  |

FIG. 26  ~770

| No. | DATA |
|---|---|
| 1 | 158169 |
| 2 | 0 |
| 3 | 654321 |
| 4 | HITACHI SALES |
| 5 | HITACHI COMPUTER |
| 6 | GINZA HEAD OFFICE |
| 7 | 90 |
| 8 | 07 |
| 9 | 29 |
| 10 | 100000 |
| 11 | 00000000 |
| 12 | DELIVERY |
| 13 |  |
| 14 |  |

METHOD FOR GENERATING FORMS AND FOR PROCESSING AND TRANSFERRING DATA AMONG THE FORMS

BACKGROUND OF THE INVENTION

1. Field of the Invention

The present invention relates to a method of generating a plurality of document forms, and more particularly to a man-machine interface at a stage of generating forms.

2. Description of the Related Art

Methods of generating a plurality of forms are described in JP-A-61-118872 and JP-A-63-163575.

JP-A-61-118872 discloses a processing method for defining a relationship among a plurality of forms (a computation expression among fields of a plurality of forms in the papers relating to an affair) and how to compute a field value of a predetermined form from a field value of a certain form based on the definition. Since the operator computes another field value based on a value entered in a certain field, reliability and simplicity of making form data are improved.

JP-A-63-163575, looking at the fact that the same information is defined in several sheets of a pad when forms in a pad including a plurality of sheets are designed, discloses that, after designing a sheet of a form which becomes the basis, the form is copied and corrected so as to make other forms. With this, a pad including a plurality of form sheets can be designed efficiently.

SUMMARY OF THE INVENTION

In the above-described conventional techniques, however, consideration as described hereunder has not been given.

In the method disclosed in JP-A-61-118872, it is possible to improve reliability and simplicity of generating form data. However, the definition information for the forms (fields) has to be given in advance of data input, and no consideration is given to the inconvenience in changing the definition among the forms (fields) at the data input stage.

In the method disclosed in JP-A-63-163575, an excellent effect is exhibited in point of the design efficiency for forms, but no consideration is given to the use of these forms.

In view of such problems in the conventional techniques, it is intended according to the present invention to improve a man-machine interface from a standpoint of using the forms, in particular.

It is an object of the present invention to provide a form-generating method which is capable of defining or correcting a plurality of definitions among forms at a stage of inputting data in the forms, from a standpoint of using the forms.

It is another object of the present invention to provide a form-generating method which is capable of realizing definitions and correction among forms only by designating corresponding areas on a screen of a display device.

In order to achieve the above-described objects, according to the present invention, forms that are related to one another are outputted to a display device based on predetermined form definitions, an area to be adopted as a transfer origin of data and an area to be adopted as a transfer destination are determined from areas of displayed forms, the data loaded in the transfer origin area are transferred to the transfer destination area based on the relationship between the transfer origin area and the transfer destination area, and transferred data are displayed in the transfer destination area. Determination of the transfer origin area and the transfer destination area is made by having a user designate with a pointing device.

Furthermore, it is also made possible to adopt an area, where an attribute equal to the attribute of the data in the transfer origin area is defined, as a transfer destination area.

Moreover, outputs of forms related with one another to the display device are displayed with overlay, and a display position of a form including the transfer origin area is altered.

Based on predetermined form definitions, the transfer origin area and the transfer destination area are designated by a user with a pointing device based on outputs of forms that are related with one another. Thus, the user can define the relationship among forms as an option. Further, when it is arranged so that an area, where an attribute equal to the attribute of the data in the transfer origin area is defined, is adopted as a transfer destination area, the user is able to not only omit designation of the transfer destination, but also to prevent errors in designation of the transfer destination. Furthermore, the forms that are related with one another are displayed with overlay, and the display position of a certain form in the transfer origin area is altered. Accordingly, the user is able to grasp the status of data transfer from the relationship of the display position on a scope, and the man-machine interface improves remarkably upon the interface heretofore in use.

The foregoing and other objects, advantages, manner of operation and novel features of the present invention will be understood from the following detailed description when read in connection with the accompanying drawings.

BRIEF DESCRIPTION OF THE DRAWINGS

FIG. 3 through FIG. 15 show configurations of varieties of tables included in a form definition file, with FIG. 7, FIG. 8 and FIG. 13 particularly showing tables for loading data inputted to a form;

FIG. 20 shows an example of a form-relation transfer table after completing data transfer definition;

FIG. 22 shows an example of a form including data input to the form;

FIG. 23 shows a display after terminating data transfer;

FIG. 24 and FIG. 25 show examples in which data are loaded in the data tables of forms; and FIG. 26 shows a data table of a form in which data have been transferred.

DETAILED DESCRIPTION OF THE PREFERRED EMBODIMENTS

Embodiments of the present invention will be described in detail hereinafter with reference to the drawings.

Figure 1:
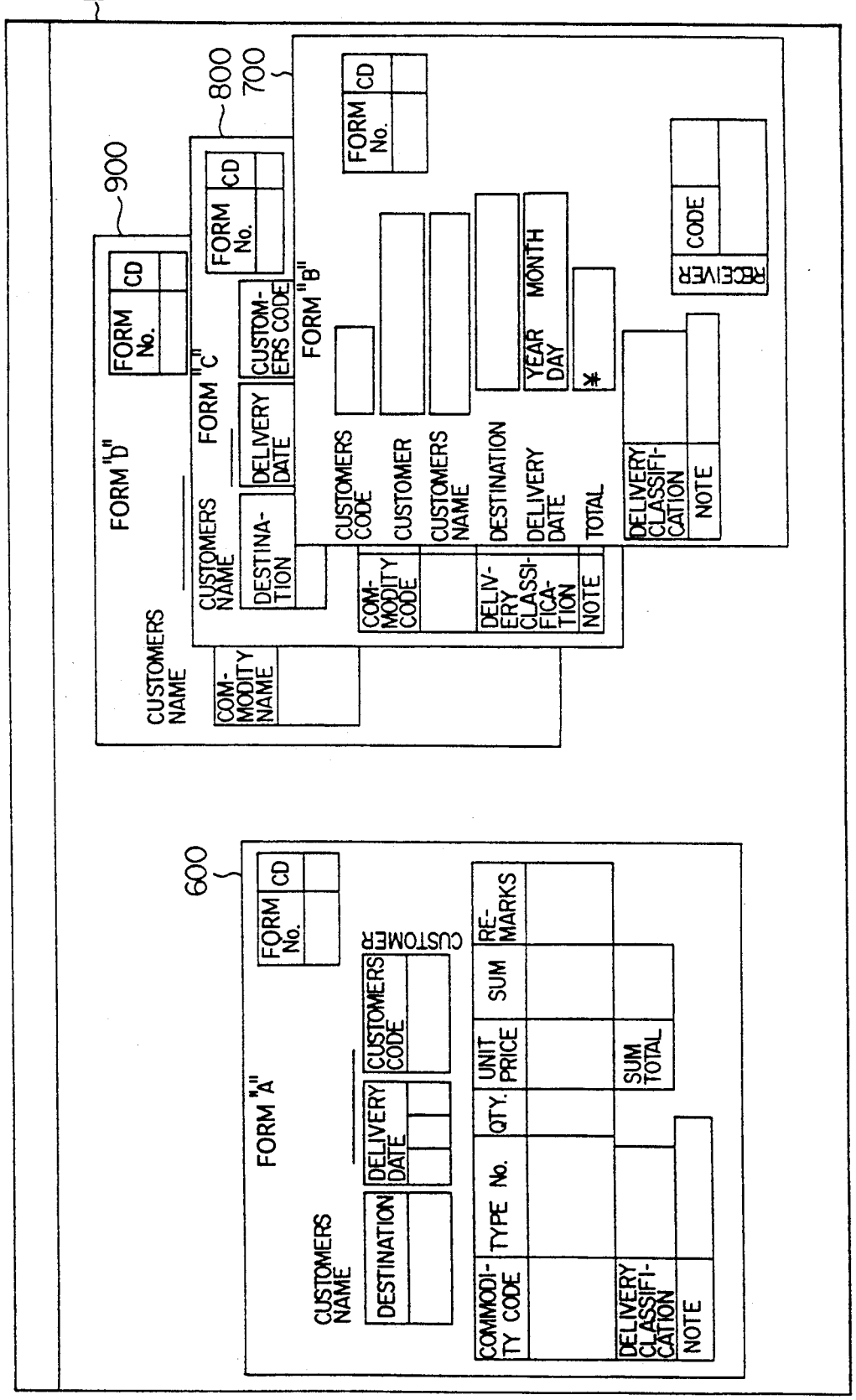
FIG. 1 shows a screen displaying a plurality of forms.

FIG. 1 shows a plurality of document forms displayed on a display device 1. Forms 600 (a sales form "A" in the figure), 700 (a sales management form "B" in the figure), 800 (a shipment form "C" in the figure) and 900 (a receipt "D" in the figure) are forms which are generated and used in connection with one another in a series of business transactions. For example, when sales of commodities are generated, predetermined items are entered in the sales form 600, and the sales form 600 is then issued. When the sales form 600 is issued, items such as customer information and sales total are posted from the sales form 600 to the sales management form 700, and the sales management form 700 is then issued.

Further, when the sales form 600 is issued, items such as commodity name, quantity and shipment data are posted from the sales form 600 to the shipment form 800, and the shipment form 800 is then issued. After relevant commodities are shipped pursuant to issuance of the shipment form 800, items such as the sales commodities name, sum, quantity and delivery date are posted from the shipment form 800 to the receipt 900, and the receipt 900 is issued. In such a manner, transfer and posting of data is performed among related forms in a series of business transactions.

According to the present invention, involvement among forms is defined, and data transfer (posting among forms as described above) is performed automatically using such definitions.

Figure 2:
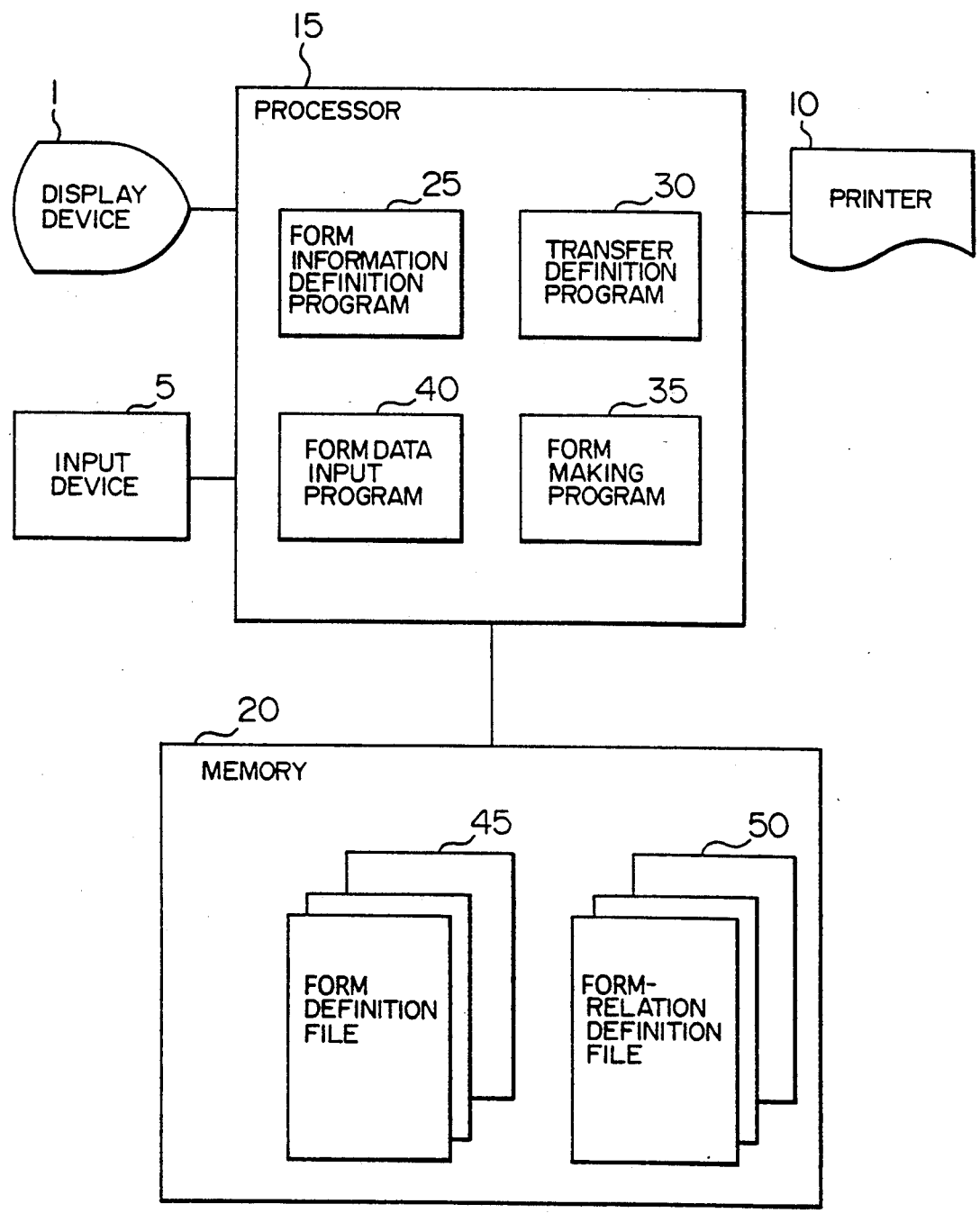
FIG. 2 shows a configuration of a system constructed according to the teachings of the present invention.

FIG. 2 shows a configuration of a system constructed according to the teachings of the present invention. The display device 1 displays forms and the like. The forms are displayed as shown in FIG. 1, for instance. An input device 5 inputs data and the like which correspond to form definition information, information giving definitions among the forms and items of the forms. A printer 10 prints various information such as the forms themselves as occasion demands. A memory 20 stores a form definition file 45 which loads form definition information, a form-relation definition file 50 which loads information related to transfer (posting) of data among the forms, and various programs and the like to be executed in a processor 15.

The processor 15 executes programs such as a form information definition program 25, a transfer definition program 30, a form-generating program 35 and a form data input program 40. Details will be described later, but outlines of functions of respective programs are as follows.

The form information definition program 25 defines a form. The transfer definition program 30 defines information related to posting of data among the forms. The form-generating program 35 generates forms based on information defined in the form information definition program 25 and the transfer definition program 30. The transfer definition program 30 is sometimes activated from the form-generating program 35 from the existing state of things. A form data input program 40 performs processing for inputting data corresponding to items of the form.

Next, contents of form definition files of the forms 600, 700, 800 and 900 will be described.

FIG. 3 through FIG. 6 show several tables included in the form definition file 45 in which definition information related to the form 600 (sales form) is loaded.

FIG. 3 shows a configuration of an item definition table 650 for loading definition information related to an area (hereinafter referred to as an item) on the form for the data which are written and read into and out of the form. The item definition table 650 consists of respective columns of item number, classification, item information, item name and attribute (data attribute such as a numeric value or a character) corresponding to the item. The item information consists of respective columns of item position in terms of row and column, size, color, display edition table pointer, processing information table pointer and data area table pointer. The display edition table, the processing information table and the data area table indicated by respective pointers will be described later. The classification column furnishes information for discriminating between a situation in which only one item is entered in one form as a form number, and a situation in which entry is made repeatedly (classification is one or more) as a commodity code and a type number. The number of items in the sales form 600 shown in FIG. 1 is 18 as shown in FIG. 3.

FIG. 4 shows a detail data table 655 for loading information related to the items (detail data items) which are entered repeatedly. The detail data items of the sales form 600 include 6 items, viz., commodity code, type number, quantity, unit price, sum and remarks as seen from FIG. 1. The detail data items are handled as an item in one block on one form sheet as described above, and the detail data table 655 is made in accordance with the number of these blocks. The detail data table 655 consists of respective columns of classification, number of items (number of detail data items), head item number, last item number, total length, number of display rows and total number of rows. The classification has the same meaning as that shown in FIG. 3.

The head item number shows the item number at the head of one block, viz., the item number at the rightmost end in the coordinates on the form. The total length means the size of all of the detail data items. The number of display rows is the number of rows occupied by the form when displayed on the display device I. The total number of detail data rows is the number of rows on an actual form. Thus, when the total number of rows exceeds the number of displayed rows, the detail data rows having the number of the exceeding detail rows are not displayed on the display device 1. A function of scrolling detail rows only is provided in order to display such detail rows.

Figures 5, 6, 7, 8:
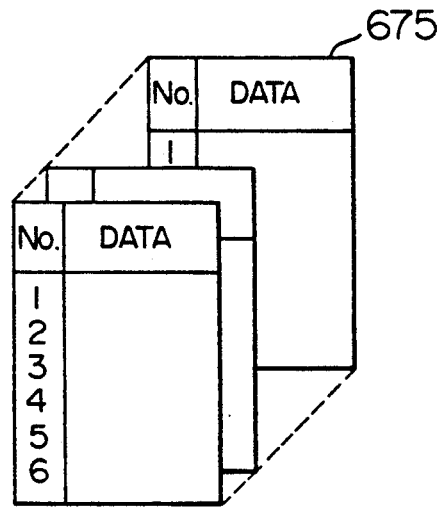

FIG. 5 shows an edition table for display 660 in which edition information is loaded for a case in which sales form 600 is displayed on the display device 1. The items may include such information as designation of display of codes such as " " and "$", designation of a comma display such as when displaying "10,000", designation of character padding as for a display of "0001" corresponding to data of "1", designation of center display (centering), right justification display and left justification display of a predetermined area, size designation showing a character size, and designation of half-tone dot meshing showing a background pattern of a character.

These items are determined corresponding to the numbers listed in the leftmost column of the figure. The No. is referred to as a display edition table pointer in FIG. 3. Taking a case in which the item number of the sales form 600 is "1" as an example, No. 1 in the display edition table 660 is referred because the display edition table pointer shown in FIG. 3 is at 1, the form number "1" being displayed as "0001" on the display device 1 because the padding character is designated.

FIG. 6 shows a processing information table 665 for defining processing information corresponding to the items obtained by computation (processing information) from the data of the items on a form. The value of the processing information table pointer of the item "sum" at the item number 14 of the item definition table 650 shown in FIG. 3 is "1", and the processing information table pointer corresponding to the item number 14 (sum) has the value "1" Thus, the corresponding processing information is described at No. 1 of the processing information table 665.

In an input information column of the table 665, information relating to input conditions such as "input error in case of a value at 100 or more" is described. The input information column is not filled in the present example, as shown in FIG. 6.

Processing information is entered in an output information column. In the present example, an expression in which the item number 12 "quantity" is multiplied by the item number 13 "unit price" of the item definition table 650 is described. Namely, (sum)=(unit price)×(quantity) is defined (note that item number 14 in the table 650, which references processing information No. 1 in table 665, represents "sum").

FIG. 7 shows a data table 670 in which contents (data) of items on a form are loaded. In this data table 670, data of the items in which the value of classification of the item definition table 650 is at "0" are loaded. The data table 670 is referred in accordance with the data area table pointer column of the item definition table 650.

FIG. 8 shows a data table 675 in which contents (data) of items on the form are loaded similarly to FIG. 7. In this data table 675, data are loaded for the items (detail data items) in which the value of classification of the item definition table 650 shows a value other than "0". The data table 675 determines the number of sheets (size) of the table in accordance with the number of rows of the detail data items (see FIG. 4). The reasons why the data table 670 and the data table 675 are shown separately is that it is more advantageous to change the table structure in point of processing, but they may also be formed in the same table.

FIG. 9 shows a rule table 680 for loading rule information of the sales form 600. In the rule table 680, row and column information for a plotting start position (left upper position for a rectangle) on a form, row and column information for an end position (right lower position for a rectangle), line type (such as a solid line or a dotted line), color, a position for designating at which portion the rule is to be plotted (i.e., top and bottom or left and right on the coordinates when the coordinates shown with the start position and the end position do not comprise a rectangle but a straight line (for example, an underline on the right of customers name in the sales form 600 shown in FIG. 1)), and line spacing (row interval) for designating whether a striping is plotted in a rectangle when the coordinates shown by the start position and the end position form a rectangle. Explanation is also made with a coordinate system using a character size as a unit for the purpose of simplifying the explanation, but an (X-Y) coordinate system using a display dot size of the display device 1 or an absolute length when printed may also be used.

A coordinate system other than the coordinate system with the character size as a unit may be used not only for processing related to a rule, but also for processing which depends on coordinates. Design and processing of a table when these coordinate systems are used may be analogized easily from the description in the present specification for those skilled in the art.

FIG. 10 shows a heading table 685 for loading character information displayed on a form outputted to the display device 1 and the printer 10. In the heading table 685, a row and a column of the display start position on a form, a direction for designating longitudinal and horizontal display directions, a size showing the length of display, color and character type showing size and shape of a character are loaded corresponding to the character to be displayed.

FIG. 11 through FIG. 15 show contents of the form definition file 45 related to the sales management form 700. FIG. 11 shows an item definition table 750. FIG. 12 shows an edition table for display 760. FIG. 13 shows a data table 770. FIG. 14 shows a rule table 780. FIG. 15 shows a heading table 785. These tables have the same configurations as respective corresponding tables which have been explained above with respect to the contents of the form definition file 45 of the sales form 600. Hence, description of configurations and contents of these tables is omitted, but description will be made as occasion demands at the description of processing.

Here, the difference between the form definition file 45 related to the sales management form 700 and the form definition file 45 of the sales form 600 will be described.

As is seen from FIG. 1, there are no detail data in the sales management form 700. Therefore, the detail data table in FIG. 5 related to the sales form 600 and the table corresponding to each of the data tables shown in FIG. 8 do not exist with respect to the sales management form 700. Further, there is no item requiring processing information in the sales management form 700, as is apparent from the item definition table shown in FIG. 11. Therefore, no processing information table exists. These tables are provided in accordance with the contents of the item definition table.

A description with respect to the contents of the form definition file of the shipment form 800 and the form definition file of the receipt 900 is omitted. The description is analogized easily from the description of the tables related to the sales form 600 and the sales management form 700.

Figure 16:
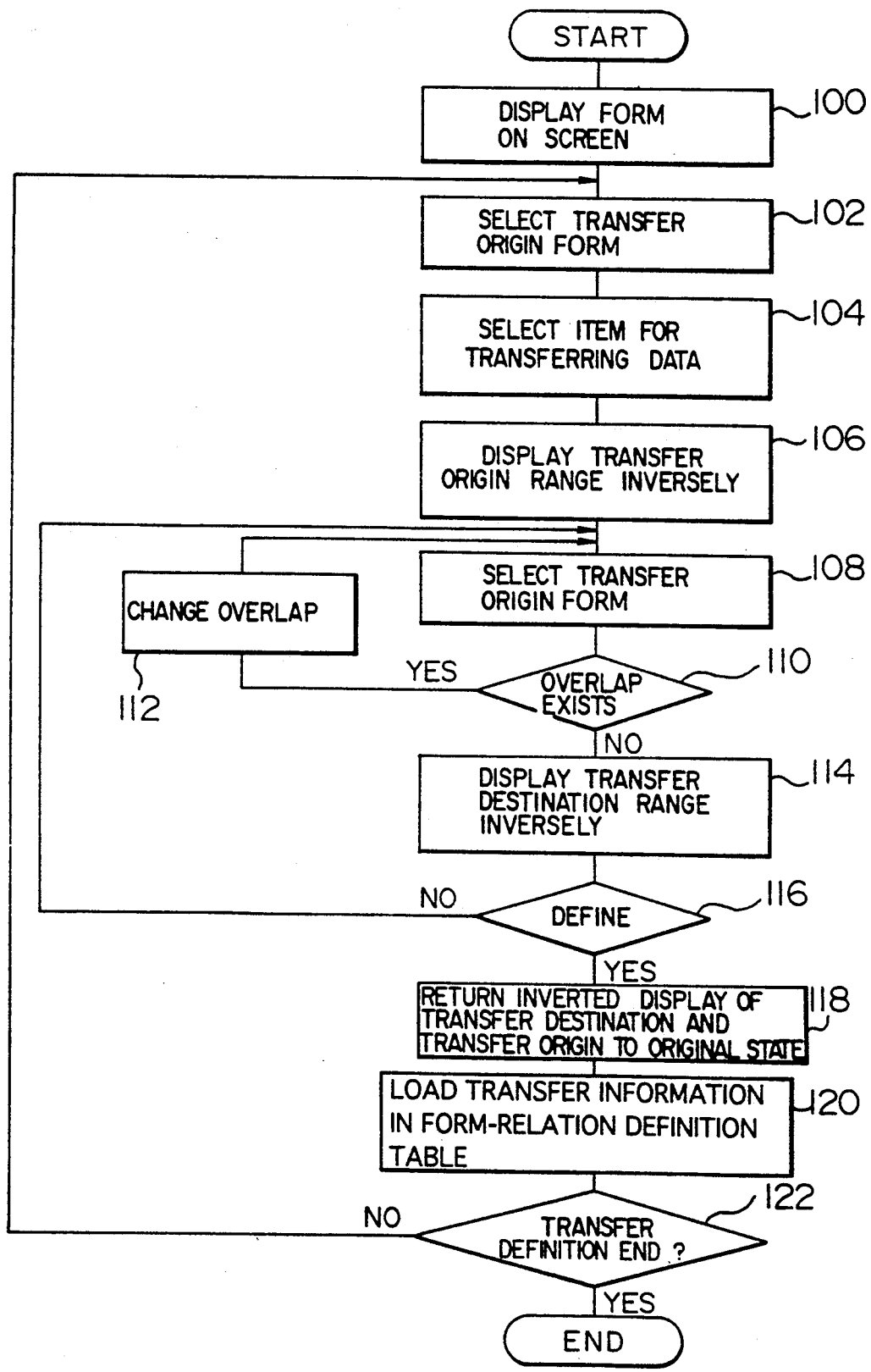
FIG. 16 is a flow chart showing the processing of definition of data transfer among forms.
Figure 17:
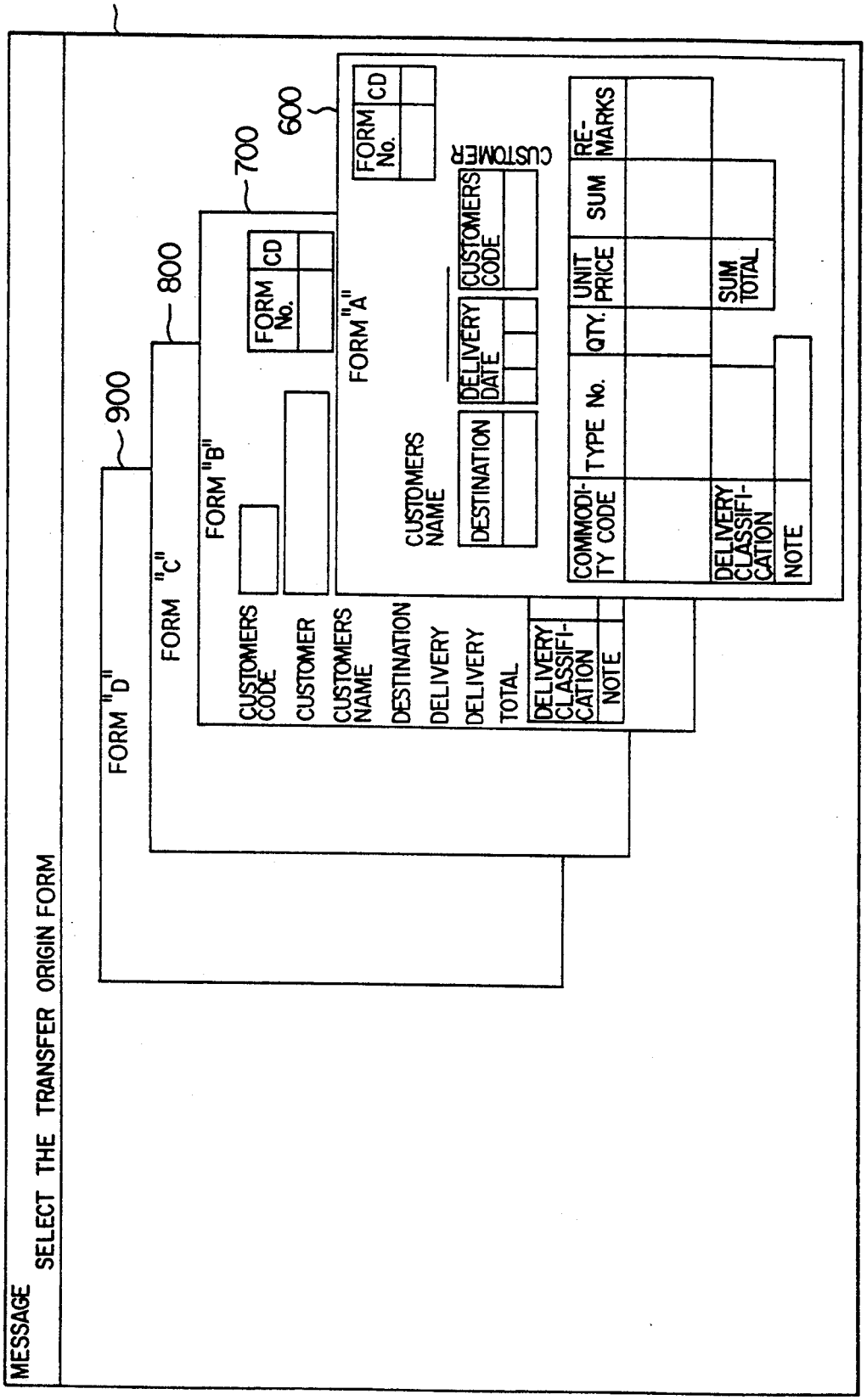
FIG. 17 through FIG. 19 illustrate displays showing the progress of data transfer definition.
Figure 18:
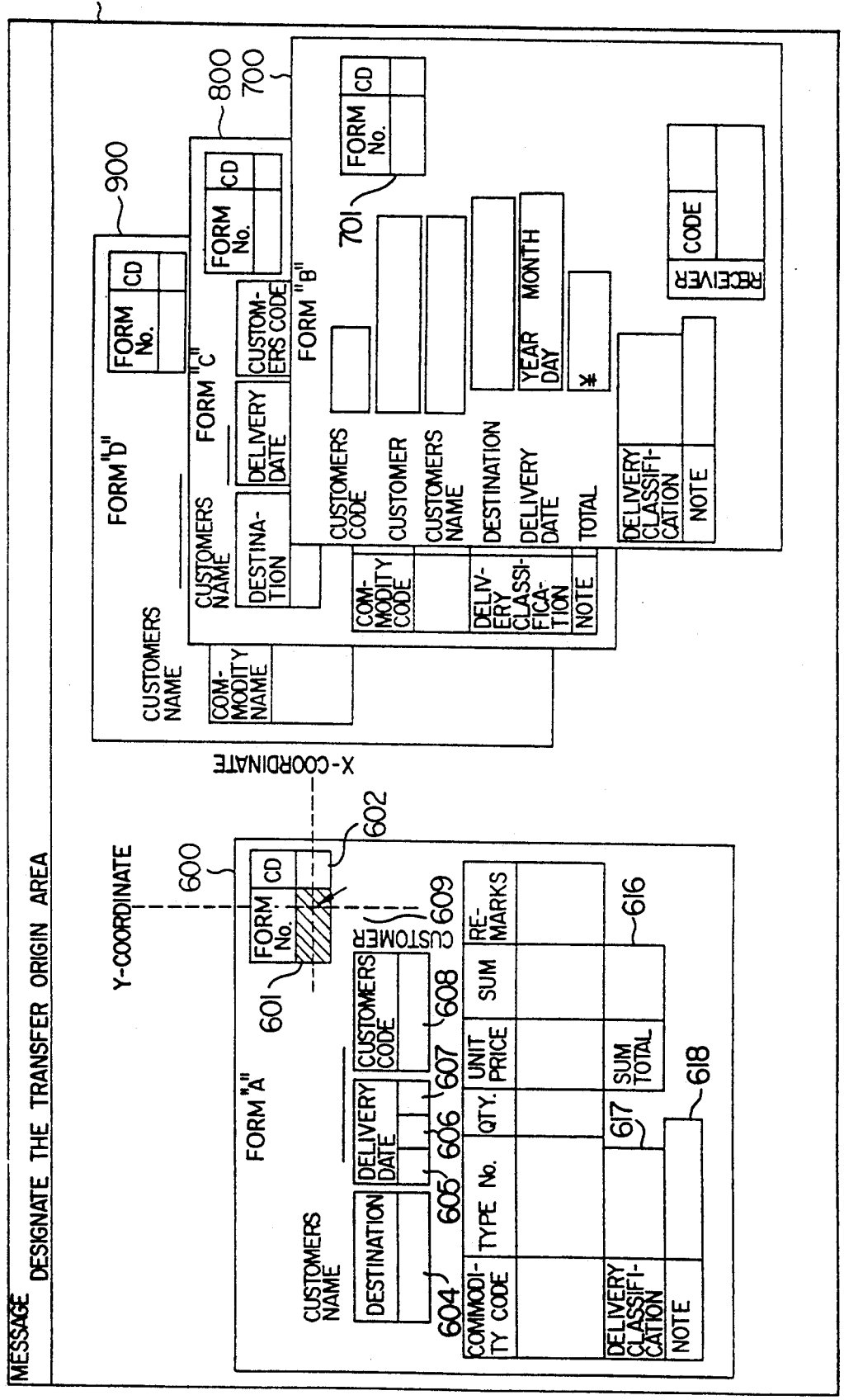
Figure 19:
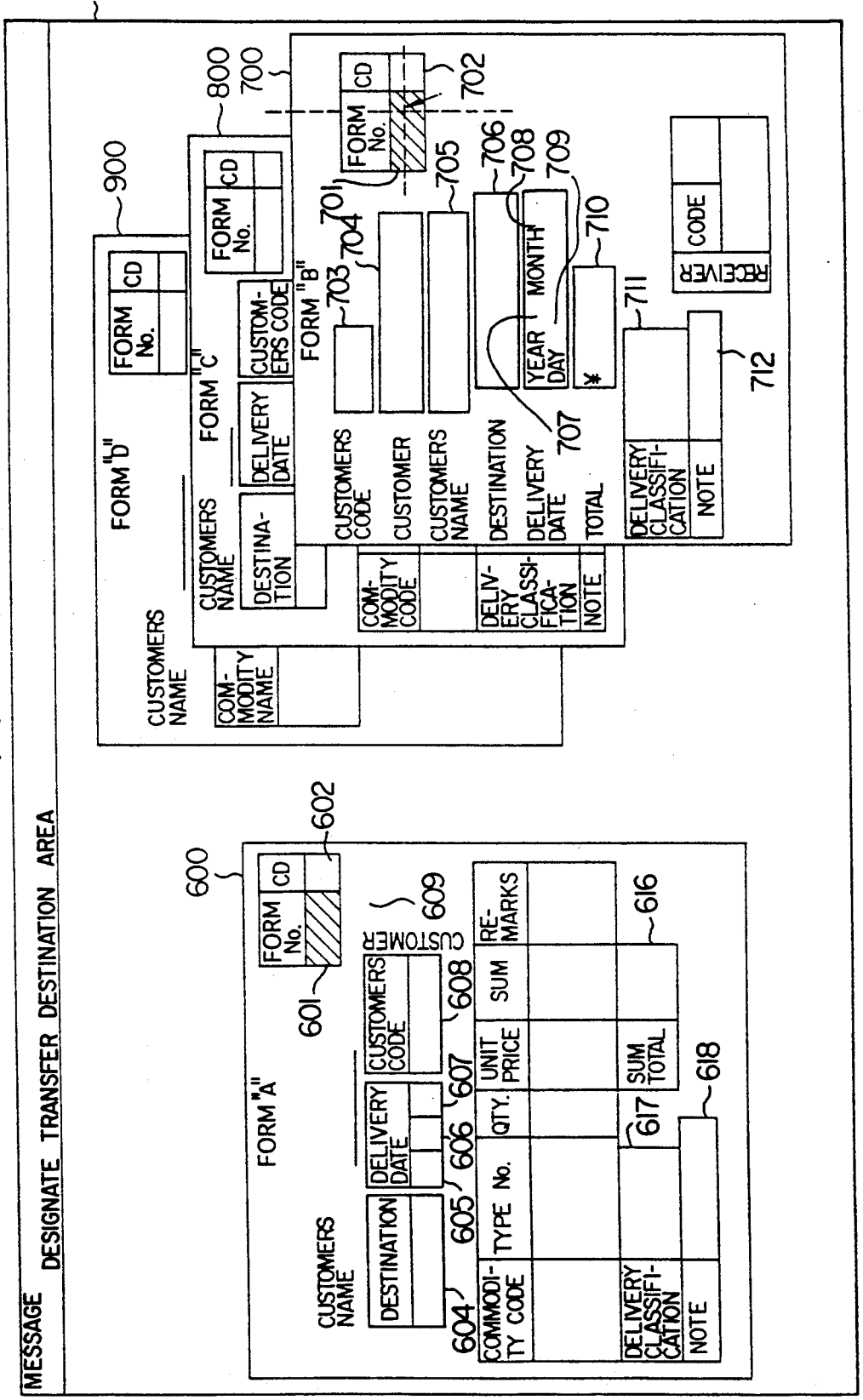

Next, a definition of data transfer among forms will be described. FIG. 16 is a flow chart showing processing of definition of data transfer among the slips. In order to make it easy to understand the description, reference will be made to a case in which the definition of data transfer from the form 600 to the form 700 is performed. FIG. 17 through FIG. 19 show display screens depicting the process of the data transfer definition, and FIG. 20 shows an "A" - "B" (form 600 - form 700) transfer table after terminating the data transfer definition.

As shown in FIG. 17, the forms 600 to 900 are displayed on the display device 1, and "Select the transfer origin form" is displayed as a message (step 100). An overlay display is desirable for the display as shown in the figure, although the overlay display need not be made. However, with no overlay, the display size may become too small, particularly since it is desirable to secure a sufficient margin in the screen of the display device 1 for a work area.

It is also possible in point of processing to secure a margin as needed, which, however, makes it difficult for a user to see because the display position of the form is altered at the stage of securing the margin. The forms 600 to 900 are displayed here as related forms. The correlation thereof may be defined in advance, but it is desirable that a form to be displayed may be designated from the input device 5.

The manner of designation can be realized easily by those skilled in the art through selection based on a list display of the forms and the like. If such a designation is made possible, required related forms can be determined according to circumstances in form processing in a field handling a variety of grades and a field handling a variety of types.

In the screen shown in FIG. 17, when the form 600 is selected (for example, by indicating form 600 with an arrow cursor) with a pointing device (a mouse), the form 600 is recognized as a transfer origin form, and the display position of the form 600 is moved as shown in FIG. 18 (step 102) (it will not be required to further describe the recognition of a selected position or the movement of a display position for those skilled in the art to understand the invention). Further, "Designate the transfer original area" is displayed as a message.

When a position where the displayed form 600 is located is designated with a pointing device by a user, it is determined whether designated coordinates show the position of the item from positional information of the item definition table 650 of the form 600 (step 104).

The item at the designated position is recognized in such a manner that designated coordinates are recognized from the coordinates on the screen, only the coordinate value at the left upper corner of the displayed form 600 is applied with offset processing, and the position and the size information of the item definition table 650 are referred from the coordinate value from the left upper corner of the form 600 applied with offset processing. In FIG. 18, the position is recognized to be a data position of a form number by judging that the designated position falls within a range from the 4th row, 71st column to the size 6 (the 79th row) of the form 600 from the position and the size information of the item definition table 650.

When the item is recognized as the transfer origin item, the display are is inverted (hatching in the figure) (step 106). Further, "Designate the transfer destination area" is displayed as the message.

In FIG. 19, when a form other than the form 600 is selected, the form is recognized as a transfer destination form (area) (step 108).

In case a form located on the underside (the interior side of the screen) of the overlay such as the forms 800 and 900 is selected, the selected form is displayed above the others, and the transfer destination area is designated again (steps 110 and 112). The processing in the steps 110 and 112 may also be performed by separating the designation of the transfer destination form and the designation of the transfer destination area from each other so as to have the user perform these operations in two steps.

Since the form 700 having no overlay has been selected in FIG. 19, the coordinates show the item from the positional information in the item definition table 750 of the form 700. The item is recognized as the transfer destination item, and the display area of the item is inverted (hatching in the figure) (step 114).

When the definition is designated or the item confirmed by double clicking on the pointing device, for example, the display of the transfer origin and the transfer destination is returned to the original, noninverted, state (steps 116 and 118).

Since 601 has been defined or confirmed as the transfer origin item and 701 has been defined or confirmed as the transfer destination item in FIG. 19, the transfer definition is loaded in an "A" - "B" (form 600 - form 700) transfer table 690 (step 120). When the data transfer definition is required further, the processing is returned to the step 102, and the data transfer definition is repeated (step 122).

FIG. 20 shows contents of the "A" form - "B" form transfer table when the transfer origin and the transfer destination are adopted to be from 601 to 701, from 602 to 702, from 603 to 705, from 604 to 706, from 605 to 707, from 606 to 708, from 607 to 709, from 608 to 703, from 609 to 704, from 616 to 710, from 617 to 711, and from 618 to 712.

Although a method of designating the transfer origin item and the transfer destination item with one-to-one correspondence has been shown in the flow chart of FIG. 16, they may also be designated en bloc. In that case, the transfer origin form and the transfer destination form are designated in advance. Thereafter, the transfer origin items in the transfer origin form are picked consecutively. Then, the display area of the relevant item is inverted corresponding to the selection. For example, an item having an item name equal to the item name in the item definition table 650 is searched out of the item definition table 750 of the slip 700 corresponding to the item whose display area is inverted in form 600, and that item is recognized as the transfer destination item.

Figure 21:
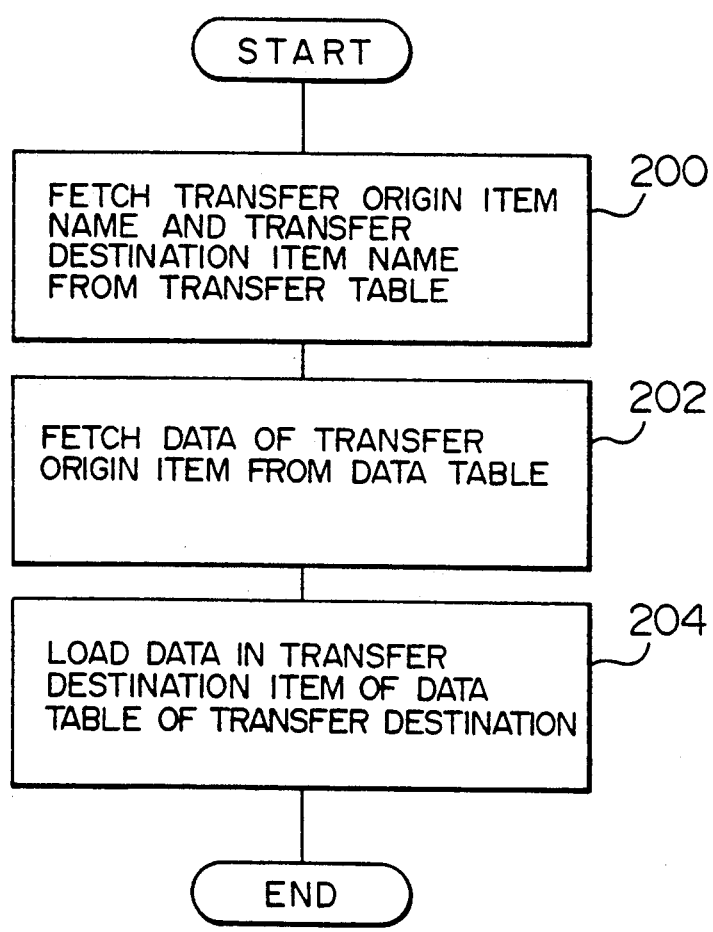
FIG. 21 is a flow chart diagram showing the operation of data transfer.

The operation of data transfer will be described in accordance with the flow chart shown in FIG. 21 based on the example of data transfer definition from the form 600 to the form 700 described above.

Figure 22:
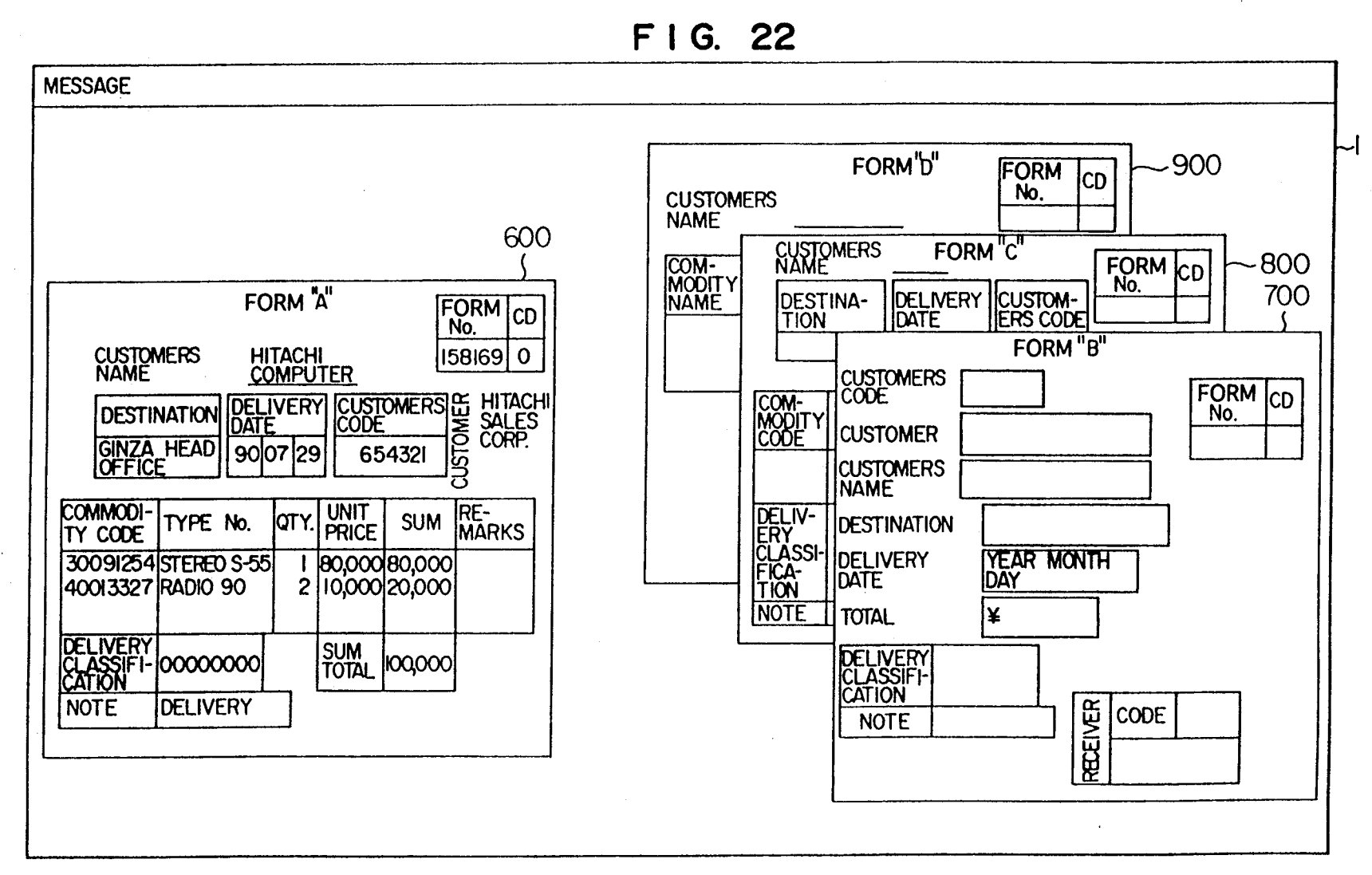

FIG. 22 shows a state in which data are inputted in the form 600. The contents of data tables 670 and 675 of the form 600 at that time are shown in FIG. 24 and FIG. 25.

A "form number" is fetched as the transfer origin item name and a "form number" is fetched as the transfer destination item name from the "A" form - "B" form transfer table 690 shown in FIG. 20 (step 200). The data "158169" at the transfer origin item name "form number" are fetched from No. 1 of the data table 670 (FIG. 7) by reference to the data area table pointer No. 1 of the item definition table 650 (the third item) (step 202). The loading area of the data table 770 (FIG. 13) of the transfer destination item name "form number" is obtained by reference to the data are table pointer No. 1 of the item definition table 750 (FIG. 11), and the data "158169" are loaded in the obtained loading area No. 1 (step 204).

Figure 23:
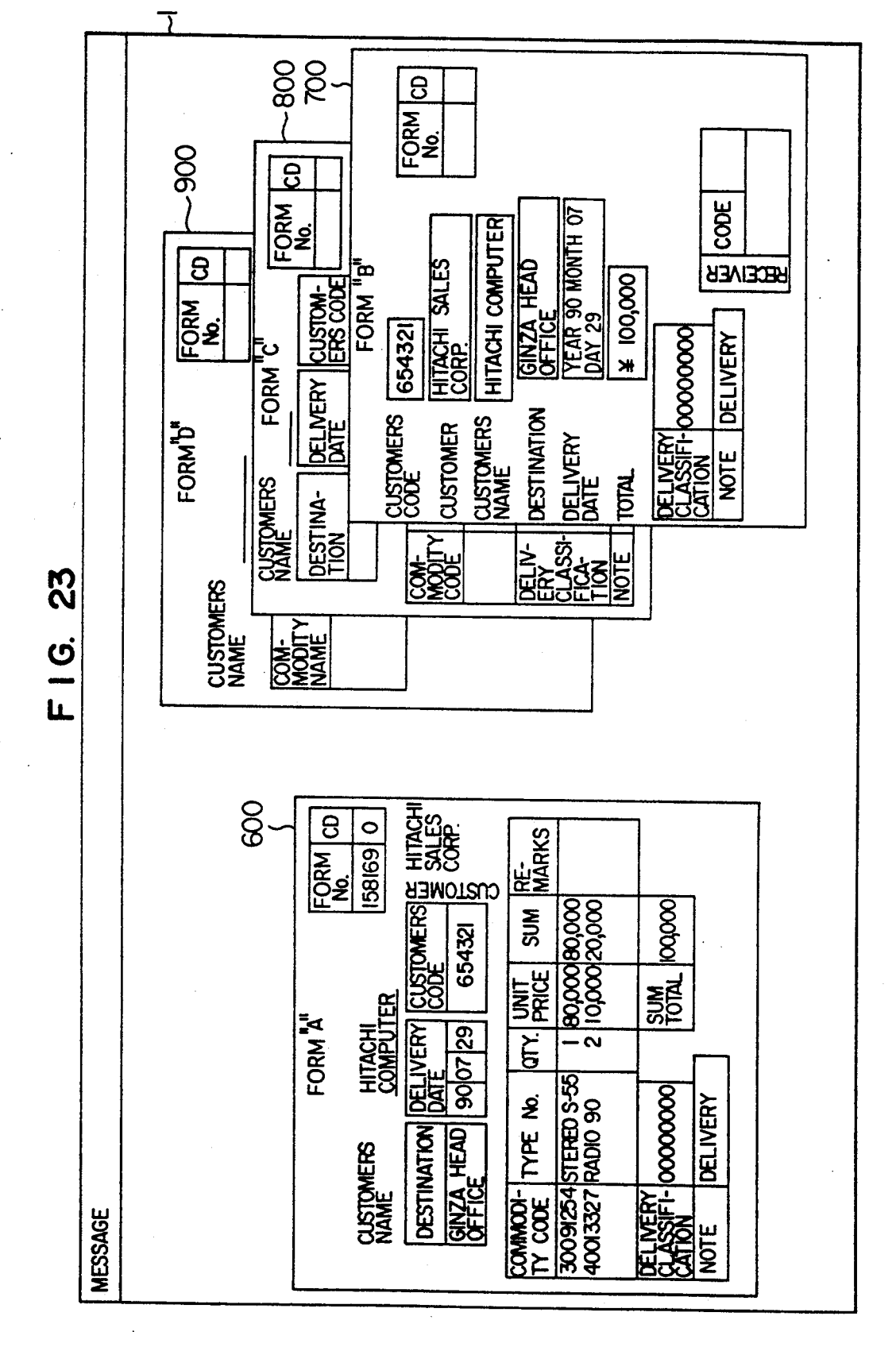

Similarly, data of all the transfer origin items defined in the "A" form - "B" form transfer table 690 are transferred to the transfer destination items. As a result, the form 600 and the form 700 appear on the display device 1 as shown in FIG. 23. The data table 770 of the form 700 appears as shown in FIG. 26.

In accordance with the invention, data of transfer origin items may be erased after data transfer as occasion demands.

According to the embodiment described above, having a user designate the transfer origin area and the transfer destination area based on outputs of mutually related forms based on the predetermined form definition, the user can define the relationship among forms as an option. Further, the user can not only omit designation of the transfer destination, but can also prevent errors in designation of the transfer destination by adopting an area, in which an attribute is equal to the attribute of the data in the transfer origin area, as the transfer destination area.

Furthermore, mutually related forms are inverted for display, and a display position of a certain form including the transfer origin area is altered. Thus, the user can grasp the state of data transfer from the relationship among display positions on the screen, and the man-machine interface improves remarkably upon the interface heretofore in use.

According to an embodiment applied with the present invention, it is possible to define or correct form-relation definition at the stage that data are inputted in the form. Further, since definition or correction among the forms can be realized only by designating the corresponding areas on the screen of the display device, a form-generating method of excellent man-machine performance is provided.

We claim:

1. A data processing method for generating forms and for processing and transferring data among the forms, comprising computer implemented steps of:
   (a) generating a plurality of kinds of mutually-related forms based upon a like plurality of predetermined form definitions, and outputting the generated plurality of forms to a display device;
   (b) displaying the plurality of forms output to the display device;
   (c) prompting an operator to select an area to be adopted as a data transfer origin area from a plurality of areas of said displayed plurality of forms;
   (d) establishing an area to be adopted as a data transfer origin area based on coordinate data of the area selected by the operator in response to step (c);
   (e) prompting the operator to select an area to be adopted as a data transfer destination area form the plurality of areas of said displayed plurality of forms;
   (f) establishing an area to be adopted as a data transfer destination area based on coordinate data of the area selected by the operator in response to step (e);
   (g) storing related information showing a relationship between said data transfer origin area and said data transfer destination area in a memory;
   (h) transferring data stored in said data transfer origin area to said data transfer destination area based on said related information and on form-related data relating to said plurality of forms; and
   (i) displaying said transferred data in said data transfer destination area of said displayed forms.

2. A data processing method according to claim 1, wherein the establishment of said data transfer origin area and said data transfer destination area in steps (d) and (f) is performed based on designation of said data transfer origin area and said data transfer destination area by said operator using a pointing device.

3. A data processing method according to claim 1, wherein establishment of said data transfer destination area is performed by selecting a form including the area selected by the operator to be adopted as the data transfer destination area, and by determining an area, where an attribute equal to the attribute of the data stored in said data transfer origin area is defined, as said data transfer destination area among the areas in said selected form.

4. A data processing method according to claim 1, wherein, if there are to be a plurality of said data transfer origin areas, based on said definition, said plurality of data transfer origin areas are established, and an area, in which an attribute equal to the attribute of the data stored in each of said plurality of data transfer origin areas in defined, is established as said data transfer destination area corresponding to each of said plurality of data transfer origin areas.

5. A data processing method according to claim 1, wherein data remaining in said data transfer origin area are erased after transfer of said data to said data transfer destination area.

6. A data processing method according to claim 1, wherein outputs of said mutually-related forms to the display device overlay one another on the display device.

7. A data processing method according to claim 6, wherein a display position of a form including said data transfer origin area is altered based on the established area to be adopted as the data transfer origin area.

8. A data processing method for generating forms and for processing and transferring data among the forms, said method performed by a form data processor and comprising computer implemented steps of:
   (a) generating a plurality of kinds of mutually-related forms based upon a like plurality of predetermined form definitions, and outputting the generated plurality of forms to a display device;
   (b) displaying the plurality of forms output to the display device;
   (c) prompting an operator to select an area to be adopted as a data transfer origin area from a plurality of areas of said displayed plurality of forms;
   (d) establishing an area to be adopted as a data transfer origin area based on coordinate data of the area selected by the operator in response to step (c);
   (e) prompting the operator to select an area to be adopted as a data transfer destination area form the plurality of areas of said displayed plurality of forms;
   (f) establishing an area to be adopted as a data transfer destination area based on coordinate data of the area selected by the operator in response to step (e);
   (g) storing related information showing a relationship between said data transfer origin area and said data transfer destination area in a memory;
   (h) transferring data stored in said data transfer origin area to said data transfer destination area based on said related information and on form-related data relating to said plurality of forms; and
   (i) displaying said transferred data in said data transfer destination area of said displayed forms.

* * * * *